United States Patent
Rich et al.

(10) Patent No.: US 12,157,292 B2
(45) Date of Patent: Dec. 3, 2024

(54) MULTILAYER COMPOSITE ARTICLE

(71) Applicant: SAINT-GOBAIN PERFORMANCE PLASTICS CORPORATION, Solon, OH (US)

(72) Inventors: David A. Rich, Nashua, NH (US); Gerard T. Buss, Bedford, NH (US); James M. McMartin, Hooksett, NH (US); Timothy P. Pollock, Manchester, NH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/664,516

(22) Filed: May 23, 2022

(65) Prior Publication Data

US 2022/0379588 A1 Dec. 1, 2022

Related U.S. Application Data

(60) Provisional application No. 63/194,537, filed on May 28, 2021.

(51) Int. Cl.
*B32B 27/32* (2006.01)
*B32B 7/12* (2006.01)
(Continued)

(52) U.S. Cl.
CPC ............. *B32B 27/322* (2013.01); *B32B 7/12* (2013.01); *B32B 27/08* (2013.01); *B32B 27/20* (2013.01);
(Continued)

(58) Field of Classification Search
None
See application file for complete search history.

(56) References Cited

U.S. PATENT DOCUMENTS

| 5,238,748 A | 8/1993 | Effenberger et al. |
| 6,759,129 B2 | 7/2004 | Fukushi |

(Continued)

FOREIGN PATENT DOCUMENTS

| CN | 103889719 A | 6/2014 |
| WO | 2017172564 A2 | 10/2017 |

(Continued)

OTHER PUBLICATIONS

MatWeb: Overview of materials for Polycarbonate, Optical Grade. (Year: 2022).*

(Continued)

*Primary Examiner* — Ramsey Zacharia
(74) *Attorney, Agent, or Firm* — Abel Schillinger, LLP; Chi Suk Kim

(57) ABSTRACT

The present disclosure relates to a composite article that may include a structural substrate, a multilayer fluoropolymer film that can include a high-melt fluoropolymer layer and a low-melt fluoropolymer adhesion layer that may contact the structural substrate and the fluoropolymer film. The high-melt fluoropolymer layer may have a melting temperature A1 and the low-melt fluoropolymer adhesive layer may have a melting temperature A2. The melting temperature A2 may be less than the melting temperature A1.

14 Claims, 4 Drawing Sheets

(51) Int. Cl.
*B32B 27/08* (2006.01)
*B32B 27/20* (2006.01)

(52) U.S. Cl.
CPC ..... *B32B 2305/30* (2013.01); *B32B 2307/738* (2013.01)

(56) References Cited

U.S. PATENT DOCUMENTS

| | | |
|---|---|---|
| 6,849,314 B2 | 2/2005 | Jing et al. |
| 7,560,166 B2 | 7/2009 | Moore et al. |
| 10,265,661 B2 | 4/2019 | Chaen et al. |
| 2005/0124717 A1 | 6/2005 | Jing et al. |
| 2005/0271867 A1* | 12/2005 | Hetzler .................. B32B 27/08 428/421 |
| 2007/0044906 A1 | 3/2007 | Park |
| 2009/0275251 A1 | 11/2009 | Bonnet et al. |
| 2011/0232735 A1 | 9/2011 | Bizet et al. |
| 2017/0077331 A1* | 3/2017 | Huang ............ H01L 31/022441 |

FOREIGN PATENT DOCUMENTS

| | | |
|---|---|---|
| WO | 2020072072 A1 | 4/2020 |
| WO | 2022251803 A1 | 12/2022 |

OTHER PUBLICATIONS

MatWeb: Overview of materials for PTFE (Year: 2023).*
MatWeb: Overview of materials for PFA (Year: 2023).*
International Search Report and Written Opinion for PCT Application No. PCT/US2022/072494, dated Sep. 5, 2022, 11 pages.

* cited by examiner

MULTILAYER COMPOSITE ARTICLE

CROSS-REFERENCE TO RELATED APPLICATION(S)

This Application claims priority under 35 U.S.C. § 119(e) to U.S. Provisional Patent Application No. 63/194,537, entitled "MULTILAYER COMPOSITE ARTICLE," by David A. RICH et al., filed May 28, 2021, which is assigned to the current assignee hereof and incorporated herein by reference in its entirety.

FIELD OF THE DISCLOSURE

The present disclosure relates to a composite article designed to provide protection, high radio frequency transmission, high hydrophobicity and/or structural integrity in a single multilayer structure.

BACKGROUND

High-frequency (5 GHz-40 GHz and above) communications applications such as 5G antennas and terrestrial-to-satellite antennas offer high speed but are very sensitive to interference because of the short wavelengths of their signals. These sensitive pieces of electronics equipment require protection from outdoor elements where they are typically installed, and this protective material must offer several functionalities. For example, it is desirable for this material to have a high RF transmission, a highly-hydrophobic surface to reduce the buildup of water, ice, and/or snow, and structural integrity in order to form a protective shape around the communications equipment. Accordingly, multilayer composite materials that show improved performance in these functionalities are desired.

SUMMARY

According to a first aspect, a composite article may include a structural substrate, a multilayer fluoropolymer film that can include a high-melt fluoropolymer layer and a low-melt fluoropolymer adhesion layer that may contact the structural substrate and the fluoropolymer film. The high-melt fluoropolymer layer may have a melting temperature A1 and the low-melt fluoropolymer adhesion layer may have a melting temperature A2. The melting temperature A2 may be less than the melting temperature A1.

According to another aspect, a composite article may include a structural substrate, a multilayer fluoropolymer film, and a low-melt fluoropolymer adhesion layer that can include PVDF. The low-melt fluoropolymer adhesion layer may contact the structural substrate and the multilayer fluoropolymer film.

According to yet another aspect, a composite article may include a structural substrate, a multilayer fluoropolymer film, and a low-melt fluoropolymer adhesion layer that can include a PVDF-HFP co-polymer. The low-melt fluoropolymer adhesion layer may contact the structural substrate and the multilayer fluoropolymer film.

According to still another aspect, a composite article may include a structural substrate, a multilayer fluoropolymer film, a transition layer and a low-melt fluoropolymer adhesion layer. The transition layer may include a mixture of PTFE and PVDF. The transition layer may further contact the multilayer fluoropolymer film and the low-melt fluoropolymer adhesive layer. The low-melt fluoropolymer adhesion layer may contact the structural substrate and the transition layer.

BRIEF DESCRIPTION OF THE DRAWINGS

Embodiments are illustrated by way of example and are not limited to the accompanying figures.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a composite article that may include a structural substrate, a multilayer fluoropolymer film and a low-melt fluoropolymer adhesion layer that contacts the structural substrate and the multilayer fluoropolymer film.

Figure 1:
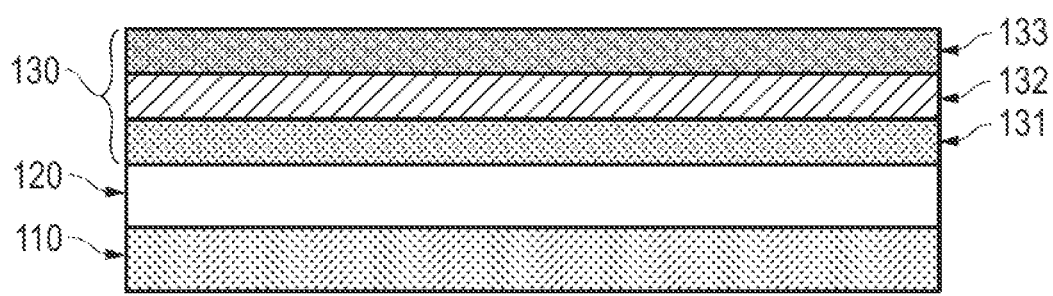
FIG. 1 includes an illustration of a composite article configured according to embodiments described herein, FIG. 2 includes an illustration of another composite article configured according to embodiments described herein, FIG. 3a includes a plot of peel extension vs. load measured during a peel strength test of a sample composite article, and FIG. 3b includes a plot of peel extension vs. load measured during a peel strength test of a sample composite article.

For purposes of illustration, FIG. 1 includes an illustration of a composite article 100 according to embodiments described herein. As shown in FIG. 1, a composite article 100 may include a structural substrate 110, a multilayer fluoropolymer film 130 and a low-melt fluoropolymer adhesive layer 120 that contacts that structural substrate 110 and the multilayer fluoropolymer film 130.

According to particular embodiments, the multilayer fluoropolymer film 130 may include a particular number of layers. According to particular embodiments, the multilayer fluoropolymer film 130 may include at least about 2 layers, such as, at least about 3 layers or at least about 4 layers or at least about 5 layers or at least about 6 layer or even at least about 7 layers. According to still other embodiments, the multilayer fluoropolymer film 130 may include not greater than about 12 layers, such as, not greater than about 11 layers or even not greater than about 10 layers. It will be appreciated that the number of layers in the multilayer fluoropolymer film 130 may be within a range between any of the minimum and maximum values noted above. It will be further appreciated that the number of layer in the multilayer fluoropolymer film 130 may be any value between any of the minimum and maximum values noted above.

According to particular embodiments, the multilayer fluoropolymer film 130 may include a particular number of fluoropolymer layers. According to particular embodiments, the multilayer fluoropolymer film 130 may include at least about 2 fluoropolymer layers, such as, at least about 3 fluoropolymer layers or at least about 4 fluoropolymer layers or at least about 5 fluoropolymer layers or at least about 6 fluoropolymer layer or even at least about 7 fluoropolymer layers. According to still other embodiments, the multilayer fluoropolymer film 130 may include not greater than about 12 fluoropolymer layers, such as, not greater than about 11 fluoropolymer layers or even not greater than about 10 fluoropolymer layers. It will be appreciated that the number of fluoropolymer layers in the multilayer fluoropolymer film 130 may be within a range between any of the minimum and maximum values noted above. It will be further appreciated that the number of fluoropolymer layer in the multilayer fluoropolymer film 130 may be any value between any of the minimum and maximum values noted above.

As shown in FIG. 1 for purposes of illustration, the multilayer fluoropolymer film 130 may include three layers (i.e., layer 131, layer 132 and layer 133).

According to particular embodiments, at least one layer of the multilayer fluoropolymer film 130 may be a high-melt fluoropolymer layer.

According to still other embodiments, the high-melt fluoropolymer layer of the fluoropolymer film 130 may have a particular melting temperature A1 as measured using differential scanning calorimetry (DSC) according to ASTM D4591, and the low-melt fluoropolymer adhesion layer 120 may have a particular melting temperature A2 as measured according to differential scanning calorimetry (DSC). According to particular embodiments, the melting temperature A2 of the low-melt fluoropolymer adhesion layer 120 may be less than the melting temperature A1 of the high-melt fluoropolymer layer of the fluoropolymer film 130.

According to still other embodiments, A2 may be a particular amount less than A1. For example, A2 may be at least about 5 percent less that A1, such as at least about 10 percent less than A1 or at least about 15 percent less that A1 or at least about 20 percent less than A1 or at least about 25 percent less than A1 or at least about 30 percent less than A1 or at least about 35 percent less than A1 or at least about 40 percent less than A1 or at least about 45 percent less than A1 or even at least about 50 percent less than A1. According to still other embodiments, A2 may be not greater than about 85 percent less than A1, such as, not greater than about 80 percent less than A1 or even not greater than about 75 percent less than A1. It will be appreciated that A2 may be a percentage less than A1 of any value within a range between any of the minimum and maximum values noted above. It will be further appreciated that A2 may be a percentage less than A1 any value between any of the minimum and maximum values noted above.

According to particular embodiments, the structural substrate 110 may include a particular material. For example, the structural substrate 110 may include a thermoformable material. According to other embodiments, the structural substrate 110 may include a thermoplastic material. According to still other embodiments, the structural substrate 110 may include FR4 epoxy glass. According to still other embodiments, the structural substrate 110 may include G10 epoxy glass. According to still other embodiments, the structural substrate 110 may include high-density polyethylene (HDPE). According to still other embodiments, the structural substrate 110 may include polypropylene (PP). According to still other embodiments, the structural substrate 110 may include polycarbonate (PC). According to still other embodiments, the structural substrate 110 may include polyethylene terephthalate (PET). According to still other embodiments, the structural substrate 110 may include PET doped with glycol (PETG). According to still other embodiments, the structural substrate 110 may include any combination of FR4 or G10 or HDPE or PP or PC or PET or PETG.

According to particular embodiments, the structural substrate 110 may consist of a particular material. For example, the structural substrate 110 may consist of a thermoformable material. According to other embodiments, the structural substrate 110 may consist of a thermoplastic material. According to still other embodiments, the structural substrate 110 may consist of FR4 epoxy glass. According to still other embodiments, the structural substrate 110 may consist of G10 epoxy glass. According to still other embodiments, the structural substrate 110 may consist of high-density polyethylene (HDPE). According to still other embodiments, the structural substrate 110 may consist of polypropylene (PP). According to still other embodiments, the structural substrate 110 may consist of polycarbonate (PC). According to still other embodiments, the structural substrate 110 may consist of polyethylene terephthalate (PET). According to still other embodiments, the structural substrate 110 may consist of PET doped with glycol (PETG). According to still other embodiments, the structural substrate 110 may consist of any combination of FR4 or G10 or HDPE or PP or PC or PET or PETG.

According to particular embodiments, the structural substrate 110 may be a layer of a particular material. For example, the structural substrate 110 may be a thermoformable material layer. According to other embodiments, the structural substrate 110 may be a thermoplastic material layer. According to still other embodiments, the structural substrate 110 may be a FR4 epoxy glass layer. According to still other embodiments, the structural substrate 110 may be a G10 epoxy glass layer. According to still other embodiments, the structural substrate 110 may be a high-density polyethylene (HDPE) layer. According to still other embodiments, the structural substrate 110 may be a polypropylene (PP) layer. According to still other embodiments, the structural substrate 110 may be a polycarbonate (PC) layer. According to still other embodiments, the structural substrate 110 may be a polyethylene terephthalate (PET) layer. According to still other embodiments, the structural substrate 110 may be a PET doped with glycol (PETG) layer. According to still other embodiments, the structural substrate 110 may layer of any combination of FR4 or G10 or HDPE or PP or PC or PET or PETG.

According to particular embodiments, the structural substrate 110 may be a substrate of a particular material. For example, the structural substrate 110 may be a thermoformable material substrate. According to other embodiments, the structural substrate 110 may be a thermoplastic material substrate. According to still other embodiments, the structural substrate 110 may be a FR4 epoxy glass substrate. According to still other embodiments, the structural substrate 110 may be a G10 epoxy glass substrate. According to still other embodiments, the structural substrate 110 may be a high-density polyethylene (HDPE) substrate. According to still other embodiments, the structural substrate 110 may be a polypropylene (PP) substrate. According to still other embodiments, the structural substrate 110 may be a polycarbonate (PC) substrate. According to still other embodiments, the structural substrate 110 may be a polyethylene terephthalate (PET) substrate. According to still other embodiments, the structural substrate 110 may be a PET doped with glycol (PETG) substrate. According to still other embodiments, the structural substrate 110 may substrate of any combination of FR4 or G10 or HDPE or PP or PC or PET or PETG.

According to still other embodiments, the structural substrate 110 may have a particular thickness. For example, the structural substrate 110 may have a thickness of at least about 0.025 mm, such as, at least about 0.03 mm or at least about 0.035 mm or at least about 0.04 mm or at least about 0.05 mm or at least about 0.06 mm or at least about 0.07 mm or at least about 0.08 mm or at least about 0.09 mm or at least about 0.1 mm or at least about 0.25 mm or at least about 0.5 mm or at least about 0.75 mm or even at least about 1.0 mm. According to still other embodiments, the structural substrate 110 may have a thickness of not greater than about 2.6 mm, such as, not greater than about 2.5 mm or not greater than about 2.4 mm or not greater than about 2.3 mm or not greater than about 2.2 mm or not greater than about 2.1 mm or not greater than about 2.0 mm or not greater than about 1.75 mm or not greater than about 1.5 mm or even not greater than about 1.25 mm. It will be appreciated that the thickness of the structural substrate 110 may be within a range between any of the minimum and maximum values noted above. It will be further appreciated that the thickness of the structural substrate 110 may be any value between any of the minimum and maximum values noted above.

According to still other embodiments, the structural substrate 110 may have a particular glass transition temperature as measured using differential scanning calorimetry (DSC) according to ASTM D3418. For example, the structural substrate 110 may have a glass transition temperature of at least about −150° C., such as at least about −140° C. or at least about −130° C. or at least about −120° C. or at least about −110° C. or at least about −100° C. or at least about −75° C. or at least about −50° C. or at least about −25° C. or at least about 0° C. or at least about 25° C. or at least about 50° C. or at least about 75° C. or even at least about 100° C. According to still other embodiments, the structural substrate 110 may have a glass transition temperature of not greater than about 350° C., such as, not greater than about 340° C. or not greater than about 330° C. or not greater than about 320° C. or not greater than about 310° C. or not greater than about 300° C. or not greater than about 275° C. or not greater than about 250° C. or not greater than about 225° C. or even not greater than about 200° C. It will be appreciated that the glass transition temperature of the structural substrate 110 may be within a range between any of the minimum and maximum values noted above. It will be further appreciated that the glass transition temperature of the structural substrate 110 may be any value between any of the minimum and maximum values noted above.

According to still other embodiments, the structural substrate 110 may have a particular degradation onset temperature as measured using thermogravimetric analysis (TGA) according to ASTM E2550. For example, the structural substrate 110 may have a degradation onset temperature of at least about 50° C., such as, at least about 60° C. or at least about 70° C. or at least about 80° C. or at least about 90° C. or at least about 100° C. or at least about 110° C. or at least about 120° C. or at least about 130° C. or at least about 140° C. or even at least about 150° C. According to still other embodiments, the structural substrate 110 may have a degradation onset temperature of not greater than about 350° C., such as, not greater than about 340° C. or not greater than about 330° C. or not greater than about 320° C. or not greater than about 310° C. or not greater than about 300° C. or not greater than about 275° C. or not greater than about 250° C. or not greater than about 225° C. or even not greater than about 200° C. It will be appreciated that the degradation onset temperature of the structural substrate 110 may be within a range between any of the minimum and maximum values noted above. It will be further appreciated that the degradation onset temperature of the structural substrate 110 may be any value between any of the minimum and maximum values noted above.

According to yet other embodiments, the multilayer fluoropolymer film 130 may include a particular material. For example, the multilayer fluoropolymer film 130 may include polytetrafluoroethylene (PTFE). According to still other embodiments, the multilayer fluoropolymer film 130 may include fluorinated ethylene propylene (FEP). According to still other embodiments, the multilayer fluoropolymer film 130 may include perfluoroalkoxy alkane (PFA). According to still other embodiments, the multilayer fluoropolymer film 130 may include modified-PTFE (TFM). According to still other embodiments, the multilayer fluoropolymer film 130 may include a terpolymer of tetrafluoroethylene, hexafluoropropylene and vinylidene fluoride (THV). According to still other embodiments, the multilayer fluoropolymer film 130 may include polyvinylidene fluoride (PVDF). According to still other embodiments, the multilayer fluoropolymer film 130 may include a copolymer of vinylidene fluoride and hexafluoropropylene (P(VDF-HFP) or PVDF-HFP). According to still other embodiments, the multilayer fluoropolymer film 130 may include any combination of PTFE, FEP, PFA, TFM, THV, PVDF, and P(VDF-HFP).

According to yet other embodiments, a fluoropolymer layer of the multilayer fluoropolymer film 130 may include a particular material. For example, a fluoropolymer layer of the multilayer fluoropolymer film 130 may include polytetrafluoroethylene (PTFE). According to still other embodiments, a fluoropolymer layer of the multilayer fluoropolymer film 130 may include fluorinated ethylene propylene (FEP). According to still other embodiments, a fluoropolymer layer of the multilayer fluoropolymer film 130 may include perfluoroalkoxy alkane (PFA). According to still other embodiments, a fluoropolymer layer of the multilayer fluoropolymer film 130 may include modified-PTFE (TFM). According to still other embodiments, a fluoropolymer layer of the multilayer fluoropolymer film 130 may include a terpolymer of tetrafluoroethylene, hexafluoropropylene and vinylidene fluoride (THV). According to still other embodiments, a fluoropolymer layer of the multilayer fluoropolymer film 130 may include polyvinylidene fluoride (PVDF). According to still other embodiments, a fluoropolymer layer of the multilayer fluoropolymer film 130 may include a copolymer of vinylidene fluoride and hexafluoropropylene (P(VDF-HFP) or PVDF-HFP). According to still other embodiments, a fluoropolymer layer of the multilayer fluoropolymer film 130 may include any combination of PTFE, FEP, PFA, TFM, THV, PVDF, and P(VDF-HFP).

According to yet other embodiments, a fluoropolymer layer of the multilayer fluoropolymer film 130 may consist of a particular material. For example, a fluoropolymer layer of the multilayer fluoropolymer film 130 may consist of polytetrafluoroethylene (PTFE). According to still other embodiments, a fluoropolymer layer of the multilayer fluoropolymer film 130 may consist of fluorinated ethylene propylene (FEP). According to still other embodiments, a fluoropolymer layer of the multilayer fluoropolymer film 130 may consist of perfluoroalkoxy alkane (PFA). According to still other embodiments, a fluoropolymer layer of the multilayer fluoropolymer film 130 may consist of modified-PTFE (TFM). According to still other embodiments, a fluoropolymer layer of the multilayer fluoropolymer film 130 may consist of a terpolymer of tetrafluoroethylene, hexafluoropropylene and vinylidene fluoride (THV). According to still other embodiments, a fluoropolymer layer of the multilayer fluoropolymer film 130 may consist of polyvinylidene fluoride (PVDF). According to still other embodiments, a fluoropolymer layer of the multilayer fluoropolymer film 130 may consist of a copolymer of vinylidene fluoride and hexafluoropropylene (P(VDF-HFP) or PVDF-HFP). According to still other embodiments, a fluoropolymer layer of the multilayer fluoropolymer film 130 may consist of any combination of PTFE, FEP, PFA, TFM, THV, PVDF, and P(VDF-HFP).

According to yet other embodiments, a fluoropolymer layer of the multilayer fluoropolymer film 130 may be a layer of a particular material. For example, a fluoropolymer layer of the multilayer fluoropolymer film 130 may be a polytetrafluoroethylene (PTFE) layer. According to still other embodiments, a fluoropolymer layer of the multilayer fluoropolymer film 130 may be fluorinated ethylene propylene (FEP) layer. According to still other embodiments, a fluoropolymer layer of the multilayer fluoropolymer film 130 may be a perfluoroalkoxy alkane (PFA) layer. According to still other embodiments, a fluoropolymer layer of the multilayer fluoropolymer film 130 may be a modified-PTFE (TFM) layer. According to still other embodiments, a fluoropolymer layer of the multilayer fluoropolymer film 130 may be a terpolymer of tetrafluoroethylene, hexafluoropropylene and vinylidene fluoride (THV) layer. According to still other embodiments, a fluoropolymer layer of the multilayer fluoropolymer film 130 may be a polyvinylidene fluoride (PVDF) layer. According to still other embodiments, a fluoropolymer layer of the multilayer fluoropolymer film 130 may be a copolymer of vinylidene fluoride and hexafluoropropylene (P(VDF-HFP) or PVDF-HFP) layer. According to still other embodiments, a fluoropolymer layer of the multilayer fluoropolymer film 130 may be a layer of any combination of PTFE, FEP, PFA, TFM, THV, PVDF, and P(VDF-HFP).

According to yet other embodiments, the high-melt fluoropolymer layer of the multilayer fluoropolymer film 130 may include a particular material. For example, the high-melt fluoropolymer layer of the multilayer fluoropolymer film 130 may include polytetrafluoroethylene (PTFE). According to still other embodiments, the high-melt fluoropolymer layer of the multilayer fluoropolymer film 130 may include fluorinated ethylene propylene (FEP). According to still other embodiments, the high-melt fluoropolymer layer of the multilayer fluoropolymer film 130 may include perfluoroalkoxy alkane (PFA). According to still other embodiments, the high-melt fluoropolymer layer of the multilayer fluoropolymer film 130 may include modified-PTFE (TFM). According to still other embodiments, the high-melt fluoropolymer layer of the multilayer fluoropolymer film 130 may include a terpolymer of tetrafluoroethylene, hexafluoropropylene and vinylidene fluoride (THV). According to still other embodiments, the high-melt fluoropolymer layer of the multilayer fluoropolymer film 130 may include polyvinylidene fluoride (PVDF). According to still other embodiments, the high-melt fluoropolymer layer of the multilayer fluoropolymer film 130 may include a copolymer of vinylidene fluoride and hexafluoropropylene (P(VDF-HFP) or PVDF-HFP). According to still other embodiments, the high-melt fluoropolymer layer of the multilayer fluoropolymer film 130 may include any combination of PTFE, FEP, PFA, TFM, THV, PVDF, and P(VDF-HFP).

According to yet other embodiments, the high-melt fluoropolymer layer of the multilayer fluoropolymer film 130 may consist of a particular material. For example, the high-melt fluoropolymer layer of the multilayer fluoropolymer film 130 may consist of polytetrafluoroethylene (PTFE). According to still other embodiments, the high-melt fluoropolymer layer of the multilayer fluoropolymer film 130 may consist of fluorinated ethylene propylene (FEP). According to still other embodiments, the high-melt fluoropolymer layer of the multilayer fluoropolymer film 130 may consist of perfluoroalkoxy alkane (PFA). According to still other embodiments, the high-melt fluoropolymer layer of the multilayer fluoropolymer film 130 may consist of modified-PTFE (TFM). According to still other embodiments, the high-melt fluoropolymer layer of the multilayer fluoropolymer film 130 may consist of a terpolymer of tetrafluoroethylene, hexafluoropropylene and vinylidene fluoride (THV). According to still other embodiments, the high-melt fluoropolymer layer of the multilayer fluoropolymer film 130 may consist of polyvinylidene fluoride (PVDF). According to still other embodiments, the high-melt fluoropolymer layer of the multilayer fluoropolymer film 130 may consist of a copolymer of vinylidene fluoride and hexafluoropropylene (P(VDF-HFP) or PVDF-HFP). According to still other embodiments, the high-melt fluoropolymer layer of the multilayer fluoropolymer film 130 may consist of any combination of PTFE, FEP, PFA, TFM, THV, PVDF, and P(VDF-HFP).

According to yet other embodiments, the high-melt fluoropolymer layer of the multilayer fluoropolymer film 130 may be a layer of a particular material. For example, the high-melt fluoropolymer layer of the multilayer fluoropolymer film 130 may be a polytetrafluoroethylene (PTFE) layer. According to still other embodiments, the high-melt fluoropolymer layer of the multilayer fluoropolymer film 130 may be fluorinated ethylene propylene (FEP) layer. According to still other embodiments, the high-melt fluoropolymer layer of the multilayer fluoropolymer film 130 may be a perfluoroalkoxy alkane (PFA) layer. According to still other embodiments, the high-melt fluoropolymer layer of the multilayer fluoropolymer film 130 may be a modified-PTFE (TFM) layer. According to still other embodiments, the high-melt fluoropolymer layer of the multilayer fluoropolymer film 130 may be a terpolymer of tetrafluoroethylene, hexafluoropropylene and vinylidene fluoride (THV) layer. According to still other embodiments, the high-melt fluororopolymer layer of the multilayer fluoropolymer film 130 may be a polyvinylidene fluoride (PVDF) layer. According to still other embodiments, the high-melt fluoropolymer layer of the multilayer fluoropolymer film 130 may be a copolymer of vinylidene fluoride and hexafluoropropylene (P(VDF-HFP) or PVDF-HFP) layer. According to still other embodiments, the high-melt fluoropolymer layer of the multilayer fluoropolymer film 130 may be a layer of any combination of PTFE, FEP, PFA, TFM, THV, PVDF, and P(VDF-HFP).

According to still other embodiments, the multilayer fluoropolymer film 130 may further include fillers. According to particular embodiments, the fillers may include titanium dioxide or carbon black or graphite or carbon nanotubes or glass fibers or glass beads or talc or a UV-absorbing filler or a white pigment filler or a pigment filler or any combination thereof.

According to still other embodiments, a fluoropolymer layer of the multilayer fluoropolymer film 130 may further include fillers. According to particular embodiments, the fillers may include titanium dioxide or carbon black or graphite or carbon nanotubes or glass fibers or glass beads or talc or a UV-absorbing filler or a white pigment filler or a pigment filler or any combination thereof.

According to still other embodiments, the high-melt fluoropolymer layer of the multilayer fluoropolymer film 130 may further include fillers. According to particular embodiments, the fillers may include titanium dioxide or carbon black or graphite or carbon nanotubes or glass fibers or glass beads or talc or a UV-absorbing filler or a white pigment filler or a pigment filler or any combination thereof.

According to still other embodiments, the multilayer fluoropolymer film 130 may have a particular thickness. For example, the multilayer fluoropolymer film 130 may have a thickness of at least about 0.005 mm, such as, at least about 0.010 mm or at least about 0.015 mm or at least about 0.020 mm or at least about 0.025 mm or at least about 0.03 mm or at least about 0.035 mm or at least about 0.04 mm or at least about 0.05 mm or at least about 0.06 mm or at least about 0.07 mm or at least about 0.08 mm or at least about 0.09 mm or even at least about 0.1 mm. According to still other embodiments, the multilayer fluoropolymer film 130 may have a thickness of not greater than about 0.25 mm, such as, not greater than about 0.24 mm or not greater than about 0.23 mm or not greater than about 0.22 mm or not greater than about 0.21 mm or not greater than about 0.20 mm or not greater than about 0.19 mm or not greater than about 0.18 mm or not greater than about 0.17 mm or not greater than about 0.16 or even not greater than about 0.15 mm. It will be appreciated that the thickness of the multilayer fluoropolymer film 130 may be within a range between any of the minimum and maximum values noted above. It will be further appreciated that the thickness of the multilayer fluoropolymer film 130 may be any value between any of the minimum and maximum values noted above.

According to still other embodiments, the high-melt fluoropolymer layer may have a particular melting temperature as measured using differential scanning calorimetry (DSC) according to ASTM D4591. For example, the high-melt fluoropolymer layer may have a melting temperature of at least about 250° C., such as, at least about 255° C. or at least about 260° C. or at least about 265° C. or at least about 270° C. or at least about 275° C. or at least about 280° C. or at least about 285° C. or at least about 290° C. or at least about 295° C. or even at least about 300° C. According to still other embodiments, the high-melt fluoropolymer layer may have a melting temperature of not greater than about 350° C., such as, not greater than about 340° C. or not greater than about 330° C. or not greater than about 320° C. or not greater than about 310° C. or not greater than about 300° C. or not greater than about 275° C. or not greater than about 250° C. or not greater than about 225° C. or even not greater than about 200° C. It will be appreciated that the melting temperature of the high-melt fluoropolymer layer may be within a range between any of the minimum and maximum values noted above. It will be further appreciated that the melting temperature of the high-melt fluoropolymer layer may be any value between any of the minimum and maximum values noted above.

According to still other embodiments, the high-melt fluoropolymer layer may have a particular thickness. For example, the high-melt fluoropolymer layer may have a thickness of at least about 0.001 mm, such as, at least about 0.005 mm or at least about 0.01 mm or at least about 0.015 mm or at least about 0.02 mm or at least about 0.25 mm at least about 0.03 mm or at least about 0.035 mm or at least about 0.04 mm or at least about 0.05 mm or at least about 0.06 mm or at least about 0.07 mm or at least about 0.08 mm or at least about 0.09 mm or at least about 0.1 mm or at least about 0.25 mm or at least about 0.5 mm or at least about 0.75 mm or even at least about 1.0 mm. According to still other embodiments, the high-melt fluoropolymer layer may have a thickness of not greater than about 0.25 mm, such as, not greater than about 0.24 mm or not greater than about 0.23 mm or not greater than about 0.22 mm or not greater than about 0.21 mm or not greater than about 0.20 mm or not greater than about 0.19 mm or not greater than about 0.18 mm or not greater than about 0.17 mm or not greater than about 0.16 or even not greater than about 0.15 mm. It will be appreciated that the thickness of the high-melt fluoropolymer layer may be within a range between any of the minimum and maximum values noted above. It will be further appreciated that the thickness of the high-melt fluoropolymer layer may be any value between any of the minimum and maximum values noted above.

According to still other embodiments, the high-melt fluoropolymer layer may include a particular content of fluoropolymer. For example, the high-melt fluoropolymer layer may have a fluoropolymer content of at least about 25 wt. % for a total weight of the high-melt fluoropolymer layer, such as, at least about 30 wt. % or at least about 35 wt. % or at least about 40 wt. % or at least about 45 wt. % or at least about 50 wt. % or at least about 55 wt. % or at least about 60 wt. % or at least about 65 wt. %. According to still other embodiments, the high-melt fluoropolymer layer may have a fluoropolymer content of not greater than about 100 wt. % for a total weight of the high-melt fluoropolymer layer, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the fluoropolymer content of the high-melt fluoropolymer layer may be within a range between any of the minimum and maximum values noted above. It will be further appreciated that the fluoropolymer content of the high-melt fluoropolymer layer may be any value between any of the minimum and maximum values noted above.

According to still other embodiments, the high-melt fluoropolymer layer may include a particular content of PTFE. For example, the high-melt fluoropolymer layer may have a PTFE content of at least about 25 wt. % for a total weight of the high-melt fluoropolymer layer, such as, at least about 30 wt. % or at least about 35 wt. % or at least about 40 wt. % or at least about 45 wt. % or at least about 50 wt. % or at least about 55 wt. % or at least about 60 wt. % or at least about 65 wt. %. According to still other embodiments, the high-melt fluoropolymer layer may have a PTFE content of not greater than about 100 wt. % for a total weight of the high-melt fluoropolymer layer, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the PTFE content of the high-melt fluoropolymer layer may be within a range between any of the minimum and maximum values noted above. It will be further appreciated that the PTFE content of the high-melt fluoropolymer layer may be any value between any of the minimum and maximum values noted above.

According to still other embodiments, the high-melt fluoropolymer layer may include a particular content of filler. For example, the high-melt fluoropolymer layer may have a filler content of at least about 0.05 wt. % for a total weight of the high-melt fluoropolymer layer, such as, at least about 0.1 wt. % or at least about 1.0 wt. % or at least about 5 wt. % or at least about 10 wt. % or at least about 20 wt. % or at least about 30 wt. % or at least about 40 wt. % or even at least about 50 wt. %. According to still other embodiments, the high-melt fluoropolymer layer may have a filler content of not greater than about 75 wt. % for a total weight of the high-melt fluoropolymer layer, such as, not greater than about 70 wt. % or not greater than about 65 wt. % or not greater than about 60 wt. % or not greater than about 55 wt. % or even not greater than about 51 wt. %. It will be appreciated that the filler content of the high-melt fluoropolymer layer may be within a range between any of the minimum and maximum values noted above. It will be further appreciated that the filler content of the high-melt fluoropolymer layer may be any value between any of the minimum and maximum values noted above.

According to still other embodiments, the low-melt fluoropolymer adhesion layer may have a particular melting temperature as measured using differential scanning calorimetry (DSC) according to ASTM D4591. For example, the low-melt fluoropolymer adhesion layer may have a melting temperature of at least about 50° C., such as, at least about 55° C. or at least about 60° C. or at least about 65° C. or at least about 70° C. or at least about 75° C. or at least about 80° C. or at least about 85° C. or at least about 90° C. or at least about 95° C. or even at least about 100° C. According to still other embodiments, the low-melt fluoropolymer adhesion layer may have a melting temperature of not greater than about 270° C., such as, not greater than about 260° C. or not greater than about 250° C. not greater than about 240° C. or not greater than about 230° C. or not greater than about 220° C. or not greater than about 210° C. or not greater than about 200° C. or not greater than about 175° C. or not greater than about 150° C. or even not greater than about 125° C. It will be appreciated that the melting temperature of the low-melt fluoropolymer adhesion layer may be within a range between any of the minimum and maximum values noted above. It will be further appreciated that the melting temperature of the low-melt fluoropolymer adhesion layer may be any value between any of the minimum and maximum values noted above.

According to yet other embodiments, the low-melt fluoropolymer adhesion layer 120 may include a particular material. For example, the low-melt fluoropolymer adhesion layer 120 may include polyvinylidene fluoride (PVDF). According to still other embodiments, the low-melt fluoropolymer adhesion layer 120 may include a terpolymer of tetrafluoroethylene, hexafluoropropylene and vinylidene fluoride (THV). According to still other embodiments, the low-melt fluoropolymer adhesion layer 120 may include ethylene tetrafluoroethylene (ETFE). According to still other embodiments, the low-melt fluoropolymer adhesion layer 120 may include ethylene chlorotrifluoroethylene (ECTFE). According to still other embodiments, the low-melt fluoropolymer adhesion layer 120 may include a PVDF-HFP co-polymer. According to still other embodiments, the low-melt fluoropolymer adhesion layer 120 may include a mixture of PVDF and PTFE (PVDF/PTFE mixture). According to still other embodiments, the low-melt fluoropolymer adhesion layer 120 may include any combination of PVDF, THV, ETFE, ECTFE, PVDF-HFP co-polymer or PVDF/PTFE mixture.

According to yet other embodiments, the low-melt fluoropolymer adhesion layer 120 may consist of a particular material. For example, the low-melt fluoropolymer adhesion layer 120 may consist of polyvinylidene fluoride (PVDF). According to still other embodiments, the low-melt fluoropolymer adhesion layer 120 may consist of a terpolymer of tetrafluoroethylene, hexafluoropropylene and vinylidene fluoride (THV). According to still other embodiments, the low-melt fluoropolymer adhesion layer 120 may consist of ethylene tetrafluoroethylene (ETFE). According to still other embodiments, the low-melt fluoropolymer adhesion layer 120 may consist of ethylene chlorotrifluoroethylene (ECTFE). According to still other embodiments, the low-melt fluoropolymer adhesion layer 120 may consist of a PVDF-HFP co-polymer. According to still other embodiments, the low-melt fluoropolymer adhesion layer 120 may consist of a mixture of PVDF and PTFE (PVDF/PTFE mixture). According to still other embodiments, the low-melt fluoropolymer adhesion layer 120 may consist of any combination of PVDF, THV, ETFE, ECTFE, PVDF-HFP co-polymer or PVDF/PTFE mixture.

According to yet other embodiments, the low-melt fluoropolymer adhesion layer 120 may be a layer of a particular material. For example, the low-melt fluoropolymer adhesion layer 120 may be a polyvinylidene fluoride (PVDF) layer. According to still other embodiments, the low-melt fluoropolymer adhesion layer 120 may be a terpolymer of tetrafluoroethylene, hexafluoropropylene and vinylidene fluoride (THV) layer. According to still other embodiments, the low-melt fluoropolymer adhesion layer 120 may be an ethylene tetrafluoroethylene (ETFE) layer. According to still other embodiments, the low-melt fluoropolymer adhesion layer 120 may be an ethylene chlorotrifluoroethylene (ECTFE) layer. According to still other embodiments, the low-melt fluoropolymer adhesion layer 120 may be a PVDF-HFP co-polymer layer. According to still other embodiments, the low-melt fluoropolymer adhesion layer 120 may be a layer of a mixture of PVDF and PTFE (PVDF/PTFE mixture). According to still other embodiments, the low-melt fluoropolymer adhesion layer 120 may be a layer of any combination of PVDF, THV, ETFE, ECTFE, PVDF-HFP co-polymer or PVDF/PTFE mixture.

According to still other embodiments, the low-melt fluoropolymer adhesion layer 120 may include a particular content of fluoropolymer. For example, the low-melt fluoropolymer adhesion layer 120 may have a fluoropolymer content of at least about 50 wt. % for a total weight of the low-melt fluoropolymer adhesion layer 120, such as, at least about 55 wt. % or at least about 60 wt. % or at least about 65 wt. % or at least about 70 wt. % or even at least about 75 wt. %. According to still other embodiments, the low-melt fluoropolymer adhesion layer 120 may have a fluoropolymer content of not greater than about 100 wt. % for a total weight of the low-melt fluoropolymer adhesion layer 120, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 77 wt. %. It will be appreciated that the fluoropolymer content of the low-melt fluoropolymer adhesion layer 120 may be within a range between any of the minimum and maximum values noted above. It will be further appreciated that the fluoropolymer content of the low-melt fluoropolymer adhesion layer 120 may be any value between any of the minimum and maximum values noted above.

According to still other embodiments, the low-melt fluoropolymer adhesion layer 120 may include a particular content of PVDF. For example, the low-melt fluoropolymer adhesion layer 120 may have a PVDF content of at least about 50 wt. % for a total weight of the low-melt fluoropolymer adhesion layer 120, such as, at least about 55 wt. % or at least about 60 wt. % or at least about 65 wt. % or at least about 70 wt. % or even at least about 75 wt. %. According to still other embodiments, the low-melt fluoropolymer adhesion layer 120 may have a PVDF content of not greater than about 100 wt. % for a total weight of the low-melt fluoropolymer adhesion layer 120, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 77 wt. %. It will be appreciated that the PVDF content of the low-melt fluoropolymer adhesion layer 120 may be within a range between any of the minimum and maximum values noted above. It will be further appreciated that the PVDF content of the low-melt fluoropolymer adhesion layer 120 may be any value between any of the minimum and maximum values noted above.

According to still other embodiments, the low-melt fluoropolymer adhesion layer 120 may include a particular content of PVDF-HFP copolymer. For example, the low-melt fluoropolymer adhesion layer 120 may have a PVDF-HFP copolymer content of at least about 50 wt. % for a total weight of the low-melt fluoropolymer adhesion layer 120, such as, at least about 55 wt. % or at least about 60 wt. % or at least about 65 wt. % or at least about 70 wt. % or even at least about 75 wt. %. According to still other embodiments, the low-melt fluoropolymer adhesion layer 120 may have a PVDF-HFP copolymer content of not greater than about 100 wt. % for a total weight of the low-melt fluoropolymer adhesion layer 120, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 77 wt. %. It will be appreciated that the PVDF-HFP copolymer content of the low-melt fluoropolymer adhesion layer 120 may be within a range between any of the minimum and maximum values noted above. It will be further appreciated that the PVDF-HFP copolymer content of the low-melt fluoropolymer adhesion layer 120 may be any value between any of the minimum and maximum values noted above.

According to still other embodiments, the PVDF-HFP co-polymer may include a particular content of HFP. For example, PVDF-HFP co-polymer may have an HFP content of at least about 0.5 wt. % for a total weight of the PVDF-HFP co-polymer, such as, at least about 1 wt. % or at least about 5 wt. % or at least about 10 wt. % or at least about 15 wt. % or at least about 20 wt. % or even at least about 25 wt. %. According to still other embodiments, the PVDF-HFP co-polymer may have an HFP content of not greater than about 50 wt. % for a total weight of the PVDF-HFP co-polymer, such as, not greater than about 45 wt. % or not greater than about 40 wt. % or not greater than about 35 wt. % or even not greater than about 30 wt. %. It will be appreciated that the HFP content of the PVDF-HFP co-polymer may be within a range between any of the minimum and maximum values noted above. It will be further appreciated that the HFP content of the PVDF-HFP co-polymer may be any value between any of the minimum and maximum values noted above.

According to still other embodiments, the PVDF-HFP co-polymer may include a particular content of PVDF. For example, PVDF-HFP co-polymer may have a PVDF content of at least about 50 wt. % for a total weight of the PVDF-HFP co-polymer, such as, at least about 55 wt. % or at least about 60 wt. % or at least about 65 wt. % or at least about 70 wt. % or even at least about 75 wt. %. According to still other embodiments, the PVDF-HFP co-polymer may have a PVDF content of not greater than about 100 wt. % for a total weight of the PVDF-HFP co-polymer, such as, not greater than about 95 wt. % or not greater than about 90 wt. % or not greater than about 85 wt. % or even not greater than about 80 wt. %. It will be appreciated that the PVDF content of the PVDF-HFP co-polymer may be within a range between any of the minimum and maximum values noted above. It will be further appreciated that the PVDF content of the PVDF-HFP co-polymer may be any value between any of the minimum and maximum values noted above.

According to certain embodiments, the low-melt fluoropolymer adhesion layer 120 may include a mixture of PVDF and PTFE. According to yet other embodiments, the low-melt fluoropolymer adhesion layer 120 may consist of a mixture of PVDF and PTFE.

According to still other embodiments, the low-melt fluoropolymer adhesion layer 120 may include a particular content of PVDF. For example, the low-melt fluoropolymer adhesion layer 120 may have a PVDF content of at least about 5 wt. % for a total weight of the low-melt fluoropolymer adhesion layer 120, such as, at least about 10 wt. % or at least about 20 wt. % or at least about 30 wt. % or at least about 40 wt. % or at least about 50 wt. % or at least about 60 wt. % or at least about 70 wt. % or at least about 75 wt. %. According to still other embodiments, the low-melt fluoropolymer adhesion layer 120 may have a PVDF content of not greater than about 100 wt. % for a total weight of the low-melt fluoropolymer adhesion layer 120, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the PVDF content of the low-melt fluoropolymer adhesion layer 120 may be within a range between any of the minimum and maximum values noted above. It will be further appreciated that the PVDF content of the low-melt fluoropolymer adhesion layer 120 may be any value between any of the minimum and maximum values noted above.

According to still other embodiments, the low-melt fluoropolymer adhesion layer 120 may include a particular content of PTFE. For example, the low-melt fluoropolymer adhesion layer 120 may have a PTFE content of at least about 5 wt. % for a total weight of the low-melt fluoropolymer adhesion layer 120, such as, at least about 10 wt. % or at least about 20 wt. % or at least about 30 wt. % or at least about 40 wt. % or at least about 50 wt. % or at least about 60 wt. % or at least about 70 wt. % or at least about 75 wt. %. According to still other embodiments, the low-melt fluoropolymer adhesion layer 120 may have a PTFE content of not greater than about 100 wt. % for a total weight of the low-melt fluoropolymer adhesion layer 120, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the PTFE content of the low-melt fluoropolymer adhesion layer 120 may be within a range between any of the minimum and maximum values noted above. It will be further appreciated that the PTFE content of the low-melt fluoropolymer adhesion layer 120 may be any value between any of the minimum and maximum values noted above.

According to still other embodiments, the low-melt fluoropolymer adhesion layer 120 may have a particular thickness. For example, the low-melt fluoropolymer adhesion layer 120 may have a thickness of at least about 0.001 mm, such as, at least about 0.0015 mm or at least about 0.002 mm or at least about 0.0025 mm or at least about 0.005 mm or at least about 0.0075 mm or at least about 0.01 mm or at least about 0.02 or at least about 0.03 mm or at least about 0.035 mm or at least about 0.04 mm or at least about 0.05 mm or at least about 0.06 mm or at least about 0.07 mm or at least about 0.08 mm or at least about 0.09 mm or even at least about 0.1 mm. According to still other embodiments, the low-melt fluoropolymer adhesion layer 120 may have a thickness of not greater than about 0.25 mm, such as, not greater than about 0.24 mm or not greater than about 0.23 mm or not greater than about 0.22 mm or not greater than about 0.21 mm or not greater than about 0.20 mm or not greater than about 0.19 mm or not greater than about 0.18 mm or not greater than about 0.17 mm or not greater than about 0.16 or even not greater than about 0.15 mm. It will be appreciated that the thickness of the low-melt fluoropolymer adhesion layer 120 may be within a range between any of the minimum and maximum values noted above. It will be further appreciated that the thickness of low-melt fluoropolymer adhesion layer 120 may be any value between any of the minimum and maximum values noted above.

According to yet other embodiments, the composite article 100 may have a particular dielectric constant as measured at 5 GHz according to ASTM D2520, Test Method C. For example the composite article 100 may have a dielectric constant of not greater than about 5.0 as measured at 5 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 100 may be within a range between any of the values noted above. It will be further appreciated that the dielectric constant of the composite article 100 may be any value between any of the values noted above.

According to other embodiments, the composite article 100 may have a particular dielectric constant as measured at 15 GHz according to ASTM D2520, Test Method C. For example the composite article 100 may have a dielectric constant of not greater than about 5.0 as measured at 15 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 100 may be within a range between any of the values noted above. It will be further appreciated that the dielectric constant of the composite article 100 may be any value between any of the values noted above.

According to still other embodiments, the composite article 100 may have a particular dielectric constant as measured at 30 GHz according to ASTM D2520, Test Method C. For example the composite article 100 may have a dielectric constant of not greater than about 5.0 as measured at 30 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 100 may be within a range between any of the values noted above. It will be further appreciated that the dielectric constant of the composite article 100 may be any value between any of the values noted above.

According to other embodiments, the composite article 100 may have a particular dielectric constant as measured at 40 GHz according to ASTM D2520, Test Method C. For example the composite article 100 may have a dielectric constant of not greater than about 5.0 as measured at 40 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 100 may be within a range between any of the values noted above. It will be further appreciated that the dielectric constant of the composite article 100 may be any value between any of the values noted above.

According to yet other embodiments, the composite article 100 may have a particular loss tangent as measured at 5 GHz according to ASTM D2520, Test Method C. For example the composite article 100 may have a loss tangent of not greater than about 0.5 as measured at 5 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 100 may be within a range between any of the values noted above. It will be further appreciated that the loss tangent of the composite article 100 may be any value between any of the values noted above.

According to other embodiments, the composite article 100 may have a particular loss tangent as measured at 15 GHz according to ASTM D2520, Test Method C. For example the composite article 100 may have a loss tangent of not greater than about 0.5 as measured at 15 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 100 may be within a range between any of the values noted above. It will be further appreciated that the loss tangent of the composite article 100 may be any value between any of the values noted above.

According to still other embodiments, the composite article 100 may have a particular loss tangent as measured at 30 GHz according to ASTM D2520, Test Method C. For example the composite article 100 may have a loss tangent of not greater than about 0.5 as measured at 30 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 100 may be within a range between any of the values noted above. It will be further appreciated that the loss tangent of the composite article 100 may be any value between any of the values noted above.

According to other embodiments, the composite article 100 may have a particular loss tangent as measured at 40 GHz according to ASTM D2520, Test Method C. For example the composite article 100 may have a loss tangent of not greater than about 0.5 as measured at 40 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 100 may be within a range between any of the values noted above. It will be further appreciated that the loss tangent of the composite article 100 may be any value between any of the values noted above.

According to still other embodiments, the composite article 100 may have a particular tensile strength as measured according to ASTM D882 (for composite articles with a thickness up to 1 mm) or ASTM D638 (for composite articles with a thickness of 1 mm or greater). For example, the tensile strength of the composite article 100 may at least about 5 MPa, such as, at least about 10 MPa or at least about 20 MPa or at least about 30 MPa or at least about 40 MPa or at least about 50 MPa or at least about 60 MPa or at least about 70 MPa or at least about 80 MPa or at least about 90 MPa or at least about 100 MPa or at least about 150 MPa or even at least about 200 MPa. According to still other embodiments, the tensile strength of the composite article 100 may be not greater than about 500 MPa, such as, not greater than about 450 MPa or even not greater than about 400 MPa. It will be appreciated that the tensile strength of the composite article 100 may be within a range between any of the minimum and maximum values noted above. It will be further appreciated that the tensile strength of the composite article 100 may be any value between any of the minimum and maximum values noted above.

According to still other embodiments, the composite article 100 may have a particular elastic modulus as measured according to ASTM D882 (for composite articles with a thickness up to 1 mm) or ASTM D638 (for composite articles with a thickness of 1 mm or greater). For example, the elastic modulus of the composite article 100 may at least about 0.1 GPa, such as, at least about 0.5 GPa or at least about 1 GPa or at least about 5 GPa or at least about 10 GPa or at least about 15 GPa or at least about 20 GPa or even at least about 25 GPa. According to still other embodiments, the elastic modulus of the composite article 100 may be not greater than about 50 GPa, such as, not greater than about 45 GPa or even not greater than about 40 GPa. It will be appreciated that the elastic modulus of the composite article 100 may be within a range between any of the minimum and maximum values noted above. It will be further appreciated that the elastic modulus of the composite article 100 may be any value between any of the minimum and maximum values noted above.

According to yet other embodiments, the composite article 100 may have a particular first peek peel strength measured using a 180° peel test performed on an Instron mechanical test frame while pulling the sample apart at a constant speed of 2 inches/min. For example, the first peak peel strength of the composite article 100 may be at least about 175 newtons per linear meter (NPM), such as, at least about 200 NPM or at least about 225 NPM or at least about 250 NPM or at least about 275 NPM or at least about 300 NPM or at least about 325 NPM or at least about 350 NPM or at least about 375 NPM or at least about 400 NPM or at least about 425 NPM or at least about 450 NPM or at least about 475 NPM or at least about 500 NPM or at least about 525 NPM or at least about 550 NPM or at least about 575 NPM or at least about 600 NPM or at least about 625 NPM or at least about 650 NPM or at least about 675 NPM or at least about 700 NPM or at least about 725 NPM or at least about 750 NPM or at least about 775 NPM or even at least about 800 NPM. It will be appreciated that the first peek peel strength of the composite article 100 may be within a range between any of the values noted above. It will be further appreciated that the first peek peel strength of the composite article 100 may be any value between any of the values noted above. Alternative embodiments described herein are further directed to a composite article that may include a structural substrate, a multilayer fluoropolymer film, a transition layer that contacts the multilayer fluoropolymer film and a low-melt fluoropolymer adhesion layer that contacts the structural substrate and the transition layer.

Figure 2:
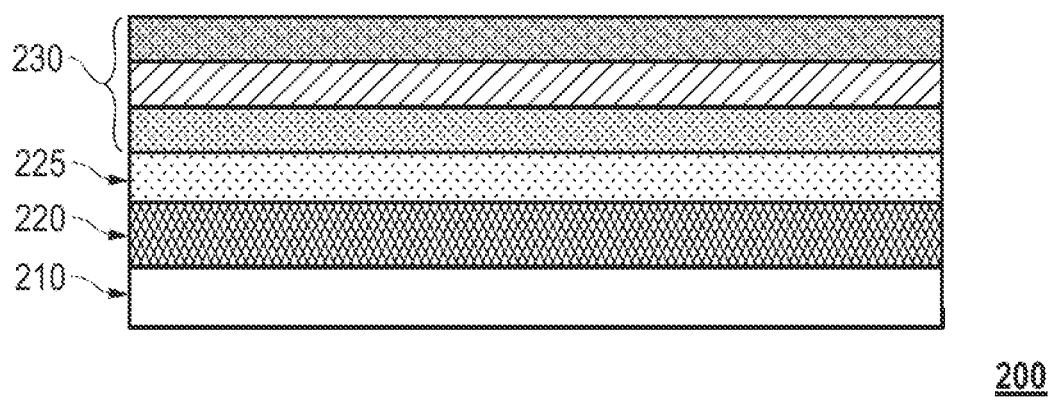

For purposes of illustration, FIG. 2 includes an illustration of a composite article 200 according to embodiments described herein. As shown in FIG. 1, a composite article 200 may include a structural substrate 210, a multilayer fluoropolymer film 230, a transition layer 225 and a low-melt fluoropolymer adhesive layer 220 that contacts that structural substrate 110 and the transition layer 225.

It will be appreciated that the composite article 200 and all components described in reference to the composite article 200 as shown in FIG. 2 may have any of the characteristics described herein with reference to corresponding components in FIG. 1. In particular, the characteristics of the composite article 200, the structural substrate 210, the multilayer fluoropolymer film 230, and the low-melt fluoropolymer adhesive layer 220 shown in FIG. 2 may have any of the corresponding characteristics described herein in reference to composite article 100, the structural substrate 110, the multilayer fluoropolymer film 130, and the low-melt fluoropolymer adhesive layer 120 shown in FIG. 1, respectively.

According to certain embodiments, the transition layer 225 may include a mixture of PVDF and PTFE. According to yet other embodiments, the transition layer 225 may consist of a mixture of PVDF and PTFE.

According to still other embodiments, the transition layer 225 may include a particular content of PVDF. For example, the transition layer 225 may have a PVDF content of at least about 5 wt. % for a total weight of the transition layer 225, such as, at least about 10 wt. % or at least about 20 wt. % or at least about 30 wt. % or at least about 40 wt. % or at least about 50 wt. % or at least about 60 wt. % or at least about 70 wt. % or at least about 75 wt. %. According to still other embodiments, the transition layer 225 may have a PVDF content of not greater than about 100 wt. % for a total weight of the transition layer 225, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the PVDF content of the transition layer 225 may be within a range between any of the minimum and maximum values noted above. It will be further appreciated that the PVDF content of the transition layer 225 may be any value between any of the minimum and maximum values noted above.

According to still other embodiments, the transition layer 225 may include a particular content of PTFE. For example, the transition layer 225 may have a PTFE content of at least about 5 wt. % for a total weight of the transition layer 225, such as, at least about 10 wt. % or at least about 20 wt. % or at least about 30 wt. % or at least about 40 wt. % or at least about 50 wt. % or at least about 60 wt. % or at least about 70 wt. % or at least about 75 wt. %. According to still other embodiments, the transition layer 225 may have a PTFE content of not greater than about 100 wt. % for a total weight of the transition layer 225, such as, not greater than about 99 wt. % or not greater than about 98 wt. % or not greater than about 97 wt. % or not greater than about 96 wt. % or not greater than about 95 wt. % or not greater than about 90 wt. % or not greater than about 85 wt. % or not greater than about 80 wt. % or even not greater than about 75 wt. %. It will be appreciated that the PTFE content of the transition layer 225 may be within a range between any of the minimum and maximum values noted above. It will be further appreciated that the PTFE content of the transition layer 225 may be any value between any of the minimum and maximum values noted above.

According to certain embodiments, the transition layer 225 may have a particular melting temperature as measured using differential scanning calorimetry (DSC) according to ASTM D4591. For example, the transition layer 225 may have a melting temperature of at least about 50° C., such as, at least about 60° C. or at least about 70° C. or at least about 80° C. or at least about 90° C. or at least about 100° C. or at least about 110° C. or at least about 120° C. or at least about 130° C. or at least about 140° C. or even at least about 150° C. According to still other embodiments, the transition layer 225 may have a melting temperature of not greater than about 350° C., such as, not greater than about 340° C. or not greater than about 330° C. or not greater than about 320° C. or not greater than about 310° C. or not greater than about 300° C. or not greater than about 275° C. or not greater than about 250° C. or not greater than about 225° C. or even not greater than about 200° C. It will be appreciated that the melting temperature of the transition layer 225 may be within a range between any of the minimum and maximum values noted above. It will be further appreciated that the melting temperature of the transition layer 225 may be any value between any of the minimum and maximum values noted above.

According to still other embodiments, the transition layer 225 may have a particular thickness. For example, the transition layer 225 may have a thickness of at least about 0.001 mm, such as, at least about 0.0015 mm or at least about 0.002 mm or at least about 0.0025 mm or at least about 0.005 mm or at least about 0.0075 mm or at least about 0.01 mm or at least about 0.02 or at least about 0.03 mm or at least about 0.035 mm or at least about 0.04 mm or at least about 0.05 mm or at least about 0.06 mm or at least about 0.07 mm or at least about 0.08 mm or at least about 0.09 mm or even at least about 0.1 mm. According to still other embodiments, the transition layer 225 may have a thickness of not greater than about 0.25 mm, such as, not greater than about 0.24 mm or not greater than about 0.23 mm or not greater than about 0.22 mm or not greater than about 0.21 mm or not greater than about 0.20 mm or not greater than about 0.19 mm or not greater than about 0.18 mm or not greater than about 0.17 mm or not greater than about 0.16 or even not greater than about 0.15 mm. It will be appreciated that the thickness of the transition layer 225 may be within a range between any of the minimum and maximum values noted above. It will be further appreciated that the thickness of the transition layer 225 may be any value between any of the minimum and maximum values noted above.

According to yet other embodiments, the composite article 200 may have a particular dielectric constant as measured at 5 GHz according to ASTM D2520, Test Method C. For example the composite article 200 may have a dielectric constant of not greater than about 5.0 as measured at 5 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 200 may be within a range between any of the values noted above. It will be further appreciated that the dielectric constant of the composite article 200 may be any value between any of the values noted above.

According to other embodiments, the composite article 200 may have a particular dielectric constant as measured at 15 GHz according to ASTM D2520, Test Method C. For example the composite article 200 may have a dielectric constant of not greater than about 5.0 as measured at 15 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 200 may be within a range between any of the values noted above. It will be further appreciated that the dielectric constant of the composite article 200 may be any value between any of the values noted above.

According to still other embodiments, the composite article 200 may have a particular dielectric constant as measured at 30 GHz according to ASTM D2520, Test Method C. For example the composite article 200 may have a dielectric constant of not greater than about 5.0 as measured at 30 GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 200 may be within a range between any of the values noted above. It will be further appreciated that the dielectric constant of the composite article 200 may be any value between any of the values noted above.

According to other embodiments, the composite article 200 may have a particular dielectric constant as measured at 40 GHz according to ASTM D2520, Test Method C. For example the composite article 200 may have a dielectric constant of not greater than about 5.0 as measured at 40

GHz, such as, not greater than about 4.5 or not greater than about 4.0 or not greater than about 3.5 or not greater than about 3.0 or not greater than about 2.5 or not greater than about 2.0 or not greater than about 1.5 or even not greater than about 1.0. It will be appreciated that the dielectric constant of the composite article 200 may be within a range between any of the values noted above. It will be further appreciated that the dielectric constant of the composite article 200 may be any value between any of the values noted above.

According to yet other embodiments, the composite article 200 may have a particular loss tangent as measured at 5 GHz according to ASTM D2520, Test Method C. For example the composite article 200 may have a loss tangent of not greater than about 0.5 as measured at 5 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 200 may be within a range between any of the values noted above. It will be further appreciated that the loss tangent of the composite article 200 may be any value between any of the values noted above.

According to other embodiments, the composite article 200 may have a particular loss tangent as measured at 15 GHz according to ASTM D2520, Test Method C. For example the composite article 200 may have a loss tangent of not greater than about 0.5 as measured at 15 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 200 may be within a range between any of the values noted above. It will be further appreciated that the loss tangent of the composite article 200 may be any value between any of the values noted above.

According to still other embodiments, the composite article 200 may have a particular loss tangent as measured at 30 GHz according to ASTM D2520, Test Method C. For example the composite article 200 may have a loss tangent of not greater than about 0.5 as measured at 30 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 200 may be within a range between any of the values noted above. It will be further appreciated that the loss tangent of the composite article 200 may be any value between any of the values noted above.

According to other embodiments, the composite article 200 may have a particular loss tangent as measured at 40 GHz according to ASTM D2520, Test Method C. For example the composite article 200 may have a loss tangent of not greater than about 0.5 as measured at 40 GHz, such as, not greater than about 0.1 or not greater than about 0.05 or not greater than about 0.01 or not greater than about 0.005 or not greater than about 0.001 or not greater than about 0.0005 or not greater than about 0.0001 or even not greater than about 0.00005. It will be appreciated that the loss tangent of the composite article 200 may be within a range between any of the values noted above. It will be further appreciated that the loss tangent of the composite article 200 may be any value between any of the values noted above.

According to still other embodiments, the composite article 200 may have a particular tensile strength as measured according to ASTM D882 (for composite articles with a thickness up to 1 mm) or ASTM D638 (for composite articles with a thickness of 1 mm or greater). For example, the tensile strength of the composite article 200 may at least about 5 MPa, such as, at least about 10 MPa or at least about 20 MPa or at least about 30 MPa or at least about 40 MPa or at least about 50 MPa or at least about 60 MPa or at least about 70 MPa or at least about 80 MPa or at least about 90 MPa or at least about 100 MPa or at least about 150 MPa or even at least about 200 MPa. According to still other embodiments, the tensile strength of the composite article 200 may be not greater than about 500 MPa, such as, not greater than about 450 MPa or even not greater than about 400 MPa. It will be appreciated that the tensile strength of the composite article 200 may be within a range between any of the minimum and maximum values noted above. It will be further appreciated that the tensile strength of the composite article 200 may be any value between any of the minimum and maximum values noted above.

According to still other embodiments, the composite article 200 may have a particular elastic modulus as measured according to ASTM D882 (for composite articles with a thickness up to 1 mm) or ASTM D638 (for composite articles with a thickness of 1 mm or greater). For example, the elastic modulus of the composite article 200 may at least about 0.1 GPa, such as, at least about 0.5 GPa or at least about 1 GPa or at least about 5 GPa or at least about 10 GPa or at least about 15 GPa or at least about 20 GPa or even at least about 25 GPa. According to still other embodiments, the elastic modulus of the composite article 200 may be not greater than about 50 GPa, such as, not greater than about 45 GPa or even not greater than about 40 GPa. It will be appreciated that the elastic modulus of the composite article 200 may be within a range between any of the minimum and maximum values noted above. It will be further appreciated that the elastic modulus of the composite article 200 may be any value between any of the minimum and maximum values noted above.

According to yet other embodiments, the composite article 200 may have a particular first peek peel strength measured using a 180° peel test performed on an Instron mechanical test frame while pulling the sample apart at a constant speed of 2 inches/min. For example, the first peak peel strength of the composite article 200 may be at least about 175 newtons per linear meter (NPM), such as, at least about 200 NPM or at least about 225 NPM or at least about 250 NPM or at least about 275 NPM or at least about 300 NPM or at least about 325 NPM or at least about 350 NPM or at least about 375 NPM or at least about 400 NPM or at least about 425 NPM or at least about 450 NPM or at least about 475 NPM or at least about 500 NPM or at least about 525 NPM or at least about 550 NPM or at least about 575 NPM or at least about 600 NPM or at least about 625 NPM or at least about 650 NPM or at least about 675 NPM or at least about 700 NPM or at least about 725 NPM or at least about 750 NPM or at least about 775 NPM or even at least about 800 NPM. It will be appreciated that the first peek peel strength of the composite article 200 may be within a range between any of the values noted above. It will be further appreciated that the first peek peel strength of the composite article 200 may be any value between any of the values noted above. It will be appreciated the composite articles formed according to embodiments described herein may be formed by particular processes including a casting process, an extrusion process, a skiving process, a molding process, a static press lamination process, a calendaring lamination process, or any other roll to roll lamination process.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A composite article comprising: a structural substrate, a multilayer fluoropolymer film comprising a high-melt fluoropolymer layer having a melting temperature A1, and a low-melt fluoropolymer adhesion layer having a melting temperature A2, wherein the low-melt fluoropolymer adhesion layer contacts the structural substrate and the multilayer fluoropolymer film, and wherein the melting temperature A2 is less than the melting temperature A1.

Embodiment 2. A composite article comprising: a structural substrate, a multilayer fluoropolymer film, and a low-melt fluoropolymer adhesion layer comprising PVDF, wherein the low-melt fluoropolymer adhesion layer contacts the structural substrate and the fluoropolymer stack.

Embodiment 3. A composite article comprising: a structural substrate, a multilayer fluoropolymer film, and a low-melt fluoropolymer adhesion layer comprising a PVDF-HFP co-polymer, wherein the low-melt fluoropolymer adhesion layer contacts the structural substrate and the fluoropolymer stack.

Embodiment 4. A composite article comprising: a structural substrate, a multilayer fluoropolymer film, a transition layer comprising a mixture of PTFE and PVDF, and a low-melt fluoropolymer adhesion layer, wherein the transition layer contacts the multilayer fluoropolymer film and the low-melt fluoropolymer adhesion layer, and wherein the low-melt fluoropolymer adhesion layer contacts the structural substrate and the transition layer.

Embodiment 5. The composite article of any one of embodiments 1, 2, 3, and 4, wherein the structural substrate comprises a thermoformable material.

Embodiment 6. The composite article of any one of embodiments 1, 2, 3, and 4, wherein the structural substrate comprises a thermoplastic material.

Embodiment 7. The composite article of any one of embodiments 1, 2, 3, and 4, wherein the structural substrate comprises FR4 or G10 or HDPE or PP or PC or PET or PETG or any combination thereof.

Embodiment 8. The composite article of any one of embodiments 1, 2, 3, and 4, wherein the structural substrate comprises a thickness of at least about 0.025 mm.

Embodiment 9. The composite article of any one of embodiments 1, 2, 3, and 4, wherein the structural substrate comprises a thickness of not greater than about 2.54 mm.

Embodiment 10. The composite article of any one of embodiments 1, 2, 3, and 4, wherein the structural substrate comprises a glass transition temperature of at least about −150° C.

Embodiment 11. The composite article of any one of embodiments 1, 2, 3, and 4, wherein the structural substrate comprises a glass transition temperature of not greater than about 350° C.

Embodiment 12. The composite article of any one of embodiments 1, 2, 3, and 4, wherein the structural substrate comprises a degradation onset temperature of at least about 50° C.

Embodiment 13. The composite article of any one of embodiments 1, 2, 3, and 4, wherein the structural substrate comprises a degradation onset temperature of not greater than about 350° C.

Embodiment 14. The composite article of any one of embodiments 1, 2, 3, and 4, wherein the multilayer fluoropolymer film comprises at least 2 layers or at least about 3 layers or at least about 4 layers or at least about 5 layers or at least about 6 layer or at least about 7 layers.

Embodiment 15. The composite article of any one of embodiments 1, 2, 3, and 4, wherein the multilayer fluoropolymer film comprises not greater than about 9 layers.

Embodiment 16. The composite article of any one of embodiments 1, 2, 3, and 4, wherein the multilayer fluoropolymer film comprises PTFE or FEP or PFA or TFM or THV or PVDF or P(VDF-HFP) or combinations thereof.

Embodiment 17. The composite article of any one of embodiments 1, 2, 3, and 4, wherein the multilayer fluoropolymer film comprises a PTFE layer or a FEP layer or a PFA layer or a TFM layer or a THV layer or a PVDF layer or a P(VDF-HFP) layer or combinations thereof.

Embodiment 18. The composite article of any one of embodiments 16 and 17, wherein the multilayer fluoropolymer film comprises fillers.

Embodiment 19. The composite article of embodiment 18, wherein the fillers comprise titanium dioxide or carbon black or graphite or carbon nanotubes or glass fibers or glass beads or talc or a UV-absorbing filler or a white pigment filler or a pigment filler or any combination thereof.

Embodiment 20. The composite article of any one of embodiments 1, 2, 3, and 4, wherein the multilayer fluoropolymer film comprises a thickness of at least about 0.005 mm.

Embodiment 21. The composite article of any one of embodiments 1, 2, 3, and 4, wherein the multilayer fluoropolymer film comprises a thickness of not greater than about 0.25 mm.

Embodiment 22. The composite article of any one of embodiments 2, 3, and 4, wherein the multilayer fluoropolymer film comprises a high-melt fluoropolymer layer.

Embodiment 23. The composite article of any one of embodiments 1 and 22, wherein the high-melt fluoropolymer layer comprises a melting temperature of at least about 250° C.

Embodiment 24. The composite article of any one of embodiments 1 and 22, wherein the high-melt fluoropolymer layer comprises a melting temperature of not greater than about 350° C.

Embodiment 25. The composite article of any one of embodiments 1 and 22, wherein the high-melt fluoropolymer layer comprises a thickness of at least about 0.001 mm.

Embodiment 26. The composite article of any one of embodiments 1 and 22, wherein the high-melt fluoropolymer layer comprises a thickness of not greater than about 0.25 mm.

Embodiment 27. The composite article of embodiment 22, wherein the high-melt fluoropolymer layer comprises a fluoropolymer content of at least about 25 wt. % for a total weight of the high-melt fluoropolymer layer.

Embodiment 28. The composite article of embodiment 22, wherein the high-melt fluoropolymer layer comprises a fluoropolymer content of not greater than about 100 wt. % for a total weight of the high-melt fluoropolymer layer.

Embodiment 29. The composite article of any one of embodiments 1 and 22, wherein the high-melt fluoropolymer layer comprises PTFE.

Embodiment 30. The composite article of embodiment 29, wherein the high-melt fluoropolymer layer comprises a PTFE content of at least about 25 wt. % for a total weight of the high-melt fluoropolymer layer.

Embodiment 31. The composite article of embodiment 29, wherein the high-melt fluoropolymer layer comprises a PTFE content of not greater than about 100 wt. % for a total weight of the high-melt fluoropolymer layer.

Embodiment 32. The composite article of any one of embodiments 1 and 22, wherein the high-melt fluoropolymer layer comprises a filler.

Embodiment 33. The composite article of embodiment 32, wherein the high-melt fluoropolymer layer comprises a filler content of at least about 0.05 wt. % for a total weight of the high-melt fluoropolymer layer.

Embodiment 34. The composite article of embodiment 32, wherein the high-melt fluoropolymer layer comprises a filler content of not greater than about 75 wt. % for a total weight of the high-melt fluoropolymer layer.

Embodiment 35. The composite article of any one of embodiments 32, 33, and 34, wherein the filler comprises wherein the fillers comprise titanium dioxide or carbon black or graphite or carbon nanotubes or glass fibers or glass beads or talc or a UV-absorbing filler or a white pigment filler or a pigment filler or any combination thereof.

Embodiment 36. The composite article of any one of embodiments 1 and 22, wherein the high-melt fluoropolymer layer is the outermost layer of the composite article.

Embodiment 37. The composite article of any one of embodiments 1, 2, 3, and 4, wherein the low-melt fluoropolymer adhesion layer comprises a melting temperature of at least about 50° C.

Embodiment 38. The composite article of any one of embodiments 1, 2, 3, and 4, wherein the low-melt fluoropolymer adhesion layer comprises a melting temperature of not greater than about 270° C.

Embodiment 39. The composite article of any one of embodiments 1, 2, 3, and 4, wherein the low-melt fluoropolymer adhesion layer comprises PVDF or THV or ETFE or ECTFE or PVDF-HFP co-polymer or any combination thereof.

Embodiment 40. The composite article of embodiment 39, wherein the low-melt fluoropolymer adhesion layer comprises a fluoropolymer content of at least about 50 wt. % for a total weight of the low-melt fluoropolymer adhesion layer.

Embodiment 41. The composite article of embodiment 39, wherein the low-melt fluoropolymer adhesion layer comprises a fluoropolymer content of not greater than about 100 wt. % for a total weight of the low-melt fluoropolymer adhesion layer.

Embodiment 42. The composite article of any one of embodiments 1, 2, 3, and 4, wherein the low-melt fluoropolymer adhesion layer comprises PVDF.

Embodiment 43. The composite article of embodiment 42, wherein the low-melt fluoropolymer adhesion layer comprises a PVDF content of at least about 25 wt. % for a total weight of the low-melt fluoropolymer adhesion layer.

Embodiment 44. The composite article of embodiment 42, wherein the low-melt fluoropolymer adhesion layer comprises a PVDF content of not greater than about 100 wt. % for a total weight of the low-melt fluoropolymer adhesion layer.

Embodiment 45. The composite article of any one of embodiments 1, 2, 3, and 4, wherein the low-melt fluoropolymer adhesion layer comprises a PVDF-HFP co-polymer.

Embodiment 46. The composite article of embodiment 45, wherein the low-melt fluoropolymer adhesion layer comprises a PVDF-HFP co-polymer content of at least about 25 wt. % for a total weight of the low-melt fluoropolymer adhesion layer.

Embodiment 47. The composite article of embodiment 45, wherein the low-melt fluoropolymer adhesion layer comprises a PVDF-HFP co-polymer content of not greater than about 100 wt. % for a total weight of the low-melt fluoropolymer adhesion layer.

Embodiment 48. The composite article of any one of embodiments 46 and 47, wherein the PVDF-HFP co-polymer comprises a HFP content of at least about 0.5 wt. % for a total weight of the low-melt fluoropolymer adhesion layer.

Embodiment 49. The composite article of any one of embodiments 46 and 47, wherein the PVDF-HFP co-polymer comprises a HFP content of not greater than about 50 wt. % for a total weight of the low-melt fluoropolymer adhesion layer.

Embodiment 50. The composite article of any one of embodiments 46 and 47, wherein the PVDF-HFP co-polymer comprises a PVDF content of at least about 50 wt. % for a total weight of the low-melt fluoropolymer adhesion layer.

Embodiment 51. The composite article of any one of embodiments 46 and 47, wherein the PVDF-HFP co-polymer comprises a PVDF content of not greater than about 99.5 wt. % for a total weight of the low-melt fluoropolymer adhesion layer.

Embodiment 52. The composite article of any one of embodiments 1, 2, 3, and 4, wherein the low-melt fluoropolymer adhesion layer comprises a thickness of at least about 0.001 mm.

Embodiment 53. The composite article of any one of embodiments 1, 2, 3, and 4, wherein the low-melt fluoropolymer adhesion layer comprises a thickness of not greater than about 0.25 mm.

Embodiment 54. The composite article of any one of embodiments 1, 2, 3, and 4, wherein the composite article further comprises a transition layer, wherein the transition layer contacts the multilayer fluoropolymer film and the low-melt fluoropolymer adhesion layer.

Embodiment 55. The composite article of any one of embodiments 4 and 54, wherein the transition layer comprises PVDF, and wherein the transition layer comprises PTFE.

Embodiment 56. The composite article of embodiment 55, wherein the transition layer comprises a PVDF content of at least about 5 wt. % for a total weight of the transition layer.

Embodiment 57. The composite article of embodiment 55, wherein the transition layer comprises a PVDF content of not greater than about 95 wt. % for a total weight of the transition layer.

Embodiment 58. The composite article of embodiment 55, wherein the transition layer comprises a PTFE content of at least about 5 wt. % for a total weight of the transition layer.

Embodiment 59. The composite article of embodiment 55, wherein the transition layer comprises a PTFE content of not greater than about 95 wt. % for a total weight of the transition layer.

Embodiment 60. The composite article of embodiment 55, wherein the transition layer comprises a melting temperature of at least about 50° C.

Embodiment 61. The composite article of embodiment 55, wherein the transition layer comprises a melting temperature of not greater than about 350° C.

Embodiment 62. The composite article of embodiment 55, wherein the transition layer comprises a thickness of at least about 0.001 mm.

Embodiment 63. The composite article of embodiment 55, wherein the transition layer comprises a thickness of not greater than about 0.25 mm.

Embodiment 64. The composite article of any one of embodiments 1, 2, 3, and 4, wherein the transition layer comprises PVDF, and wherein the transition layer comprises PTFE.

Embodiment 65. The composite article of embodiment 64, wherein the transition layer comprises a PVDF content of at least about 5 wt. % for a total weight of the transition layer.

Embodiment 66. The composite article of embodiment 64, wherein the transition layer comprises a PVDF content of not greater than about 95 wt. % for a total weight of the transition layer.

Embodiment 67. The composite article of embodiment 64, wherein the transition layer comprises a PTFE content of at least about 5 wt. % for a total weight of the transition layer.

Embodiment 68. The composite article of embodiment 64, wherein the transition layer comprises a PTFE content of not greater than about 95 wt. % for a total weight of the transition layer.

EXAMPLES

The concepts described herein will be further described in the following Examples, which do not limit the scope of the invention described in the claims.

Example 1

Two sample composite articles S1 and S2 were formed according to embodiments described herein.

Sample composite article S1 included a structural substrate (SS) bonded to a multilayer fluoropolymer film (MFF) using a low-melt fluoropolymer adhesive layer (LMA) and a transition layer (TL). The configuration of sample composite article S1 was SS/LMA/TL/MFF. The multilayer fluoropolymer film has a total thickness of 0.066 mm. The structural substrate was a 0.381 mm thick FR4 substrate. The low-melt fluoropolymer adhesive layer was a PVDF layer with a bond strength greater than 1.0 PLI. The transition layer was PTFE-PVDF that included 50 wt. % PTFE for a total weight of the transition layer and 50 wt. % PVDF for a total weight of the transition layer. The multilayer fluoropolymer film included 3 fluoropolymer layers. The first fluoropolymer layer (i.e., the layer overlying and contacting the transition layer) was a PTFE layer filled with 4 wt. % UV-absorbing carbon black for a total weight of the first layer. The second fluoropolymer layer (i.e., the layer overlying and contacting the first fluoropolymer layer) was a PTFE layer filled with 8 wt. % $TiO_2$ white pigment for a total weight of the second fluoropolymer layer. The third fluoropolymer layer (i.e., the layer overlying and contacting the second fluoropolymer layer) was a clear, hydrophobic PTFE surface layer. The composite article S1 was laminated at a temperature of 177° C., at a pressure of 4 MPa, and at a residence time of 1 min.

Sample composite article S2 included a structural substrate (SS) bonded to a multilayer fluoropolymer film (MFF) using a low-melt fluoropolymer adhesive layer (LMA) and a transition layer (TL). The configuration of sample composite article S2 was SS/LMA/TL/MFF. The multilayer fluoropolymer film has a total thickness of 0.066 mm. The structural substrate was a 0.381 mm thick FR4 substrate. The low-melt fluoropolymer adhesive layer was a P(VDF-HFP) copolymer layer with 4.5 wt. % HFP for a total weight of the low-melt fluoropolymer adhesive layer and a bond strength greater than 1.0 PLI. The transition layer was PTFE-P(VDF-HFP) that included 50 wt. % PTFE for a total weight of the transition layer and 50 wt. % P(VDF-HFP) copolymer for a total weight of the transition layer. The multilayer fluoropolymer film included 3 fluoropolymer layers. The first fluoropolymer layer (i.e., the layer overlying and contacting the transition layer) was a PTFE layer filled with 4 wt. % UV-absorbing carbon black for a total weight of the first layer. The second fluoropolymer layer (i.e., the layer overlying and contacting the first fluoropolymer layer) was a PTFE layer filled with 8 wt. % $TiO_2$ white pigment for a total weight of the second fluoropolymer layer. The third fluoropolymer layer (i.e., the layer overlying and contacting the second fluoropolymer layer) was a clear, hydrophobic PTFE surface layer. The composite article S2 was laminated at a temperature of 177° C., at a pressure of 4 MPa, and at a residence time of 1 min.

For purposes of comparison, a comparative sample composite article CS1 was prepared.

Comparative sample composite article CS1 included a structural substrate (SS) bonded to a PTFE case film (PCF). The configuration of the comparative sample composite article CS1 was SS/PCF. The structural substrate was a 0.381 mm thick FR4 substrate. The PTFE case film had a thickness of 3 mils. The sample composite article CS1 was laminated at a temperature of 177° C., at a pressure of 4 MPa, and at a residence time of 1 min.

Sample composite articles S1 and S2 and comparative sample composite article CS1 were tested to determine their first peak peel strength. First peak peel strength was tested using a 180° peel test performed on an Instron mechanical test frame while pulling the sample apart at a constant speed of 2 inches/min.

Figure 3A:
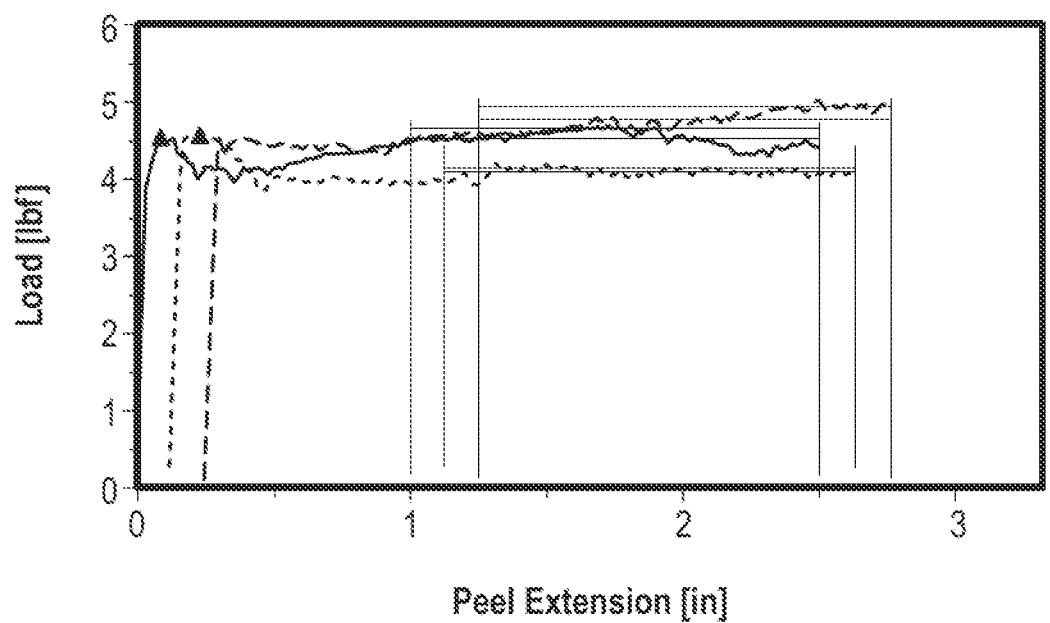
Figure 3B:
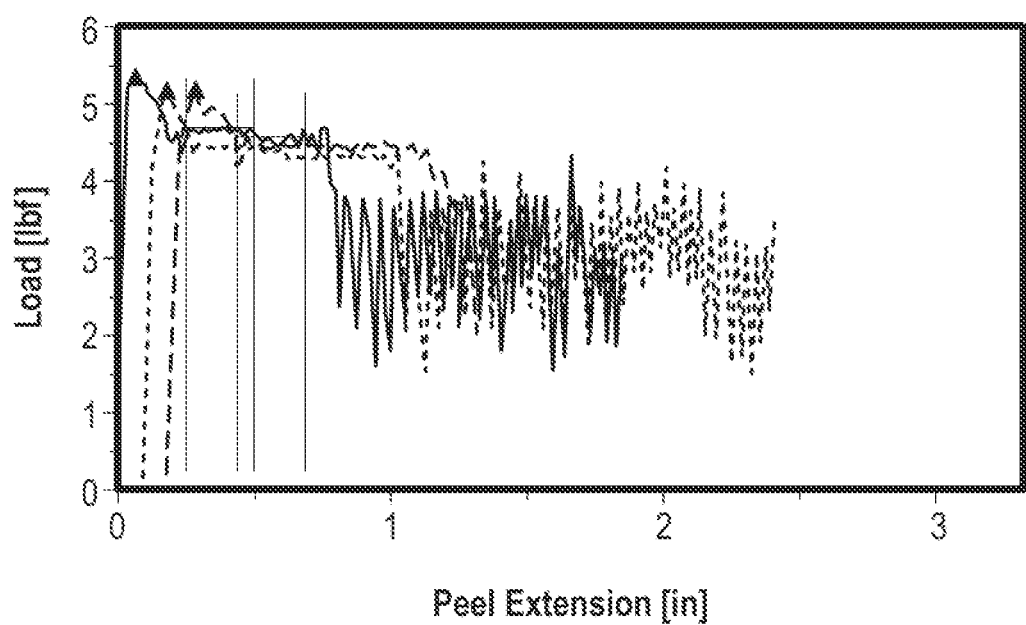

FIG. 3a includes a plot of the peel extension vs. the load applied during the peel strength test of sample composite article S1. FIG. 3b includes a plot of the peel extension vs. the load applied during the peel strength test of sample composite article S2. The results of the peel strength tests as summarized in table 1 below.

TABLE 1

| First Peek Peel Strength Comparison | | |
|---|---|---|
| Sample | First Peek Peel Strength (PLI) | First Peek Peel Strength (NPM) |
| S1 | 4.6 | 805.6 |
| S2 | 5.2 | 910.7 |
| CS1 | <0.1 | <17.5 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite article comprising:
a structural substrate,
a multilayer fluoropolymer film comprising a high-melt fluoropolymer layer having a melting temperature A1, and
a low-melt fluoropolymer adhesion layer having a melting temperature A2,
wherein the low-melt fluoropolymer adhesion layer contacts the structural substrate and the multilayer fluoropolymer film, and
wherein A1 is at least about 250° C. and not greater than about 350° C.,
wherein A2 is at least about 50° C. and not greater than about 270° C.,
wherein the melting temperature A2 is at least about 5% less than the melting temperature A1,
wherein the melting temperature A2 is not greater than about 85% less than the melting temperature A1,
wherein the low-melt fluoropolymer adhesion layer comprises PVDF or THV or ETFE or ECTFE or PVDF-HFP co-polymer or any combination thereof,
wherein the high-melt fluoropolymer layer comprises PTFE or FEP or PFA or TFM or THV or PVDF or P(VDF-HFP) or combinations thereof, at a content of at least about 25 wt. % for a total weight of the high-melt fluoropolymer layer, and
wherein the composite article comprises a first peek peel strength of at least about 175 NPM.

2. The composite article of claim 1, wherein the structural substrate comprises a thermoformable material.

3. The composite article of claim 1, wherein the structural substrate comprises a thermoplastic material.

4. The composite article of claim 1, wherein the structural substrate comprises a glass transition temperature of at least about −150° C. and not greater than about 350° C.

5. The composite article of claim 4, wherein the multilayer fluoropolymer film comprises fillers.

6. The composite article of claim 5, wherein the fillers comprise titanium dioxide or carbon black or graphite or carbon nanotubes or glass fibers or glass beads or talc or a UV-absorbing filler or a white pigment filler or a pigment filler or any combination thereof.

7. The composite article of claim 1, wherein the low-melt fluoropolymer adhesion layer comprises PVDF.

8. The composite article of claim 1, wherein the low-melt fluoropolymer adhesion layer comprises a PVDF-HFP co-polymer.

9. A composite article comprising:
a structural substrate,
a multilayer fluoropolymer film comprising a high-melt fluoropolymer layer having a melting temperature A1, and
a low-melt fluoropolymer adhesion layer comprising PVDF having a melting temperature A2,
wherein the low-melt fluoropolymer adhesion layer contacts the structural substrate and the fluoropolymer stack multilayer fluoropolymer film,
wherein the high-melt fluoropolymer layer has a melting temperature of at least about 250° C. and not greater than about 350° C.,
wherein the low-melt fluoropolymer layer has a least about 50° C. and not greater than about 240° C.,
wherein the melting temperature A2 is at least about 5% less than the melting temperature A1, and
wherein the melting temperature A2 is not greater than about 85% less than the melting temperature A1,
wherein the high-melt fluoropolymer layer comprises PTFE or FEP or PFA or TFM or THV or PVDF or P(VDF-HFP) or combinations thereof, at a content of at least about 25 wt. % for a total weight of the high-melt fluoropolymer layer, and
wherein the composite article comprises a first peck peel strength of at least about 175 NPM.

10. The composite article of claim 9, wherein the structural substrate comprises a thermoformable material.

11. The composite article of claim 9, wherein the structural substrate comprises a thermoplastic material.

12. The composite article of claim 9, wherein the structural substrate comprises a glass transition temperature of at least about −150° C. and not greater than about 350° C.

13. The composite article of claim 12, wherein the multilayer fluoropolymer film comprises fillers.

14. A composite article comprising:
a structural substrate,
a multilayer fluoropolymer film comprising a high-melt fluoropolymer layer having a melting temperature A1, and
a low-melt fluoropolymer adhesion layer comprising a PVDF-HFP co-polymer having a melting temperature A2,
wherein the low-melt fluoropolymer adhesion layer contacts the structural substrate and the multilayer fluoropolymer film,
wherein the high-melt fluoropolymer layer has a melting temperature of at least about 250° C. and not greater than about 350° C.,
wherein the low-melt fluoropolymer layer has a least about 50° C. and not greater than about 240° C.,
wherein the melting temperature A2 is at least about 5% less than the melting temperature A1, and
wherein the melting temperature A2 is not greater than about 85% less than the melting temperature A1,
wherein the high-melt fluoropolymer layer comprises PTFE or FEP or PFA or TFM or THV or PVDF or P(VDF-HFP) or combinations thereof, at a content of at least about 25 wt. % for a total weight of the high-melt fluoropolymer layer, and wherein the composite article comprises a first peek peel strength of at least about 175 NPM.

* * * * *